US007760823B2

United States Patent
Priotti

(10) Patent No.: US 7,760,823 B2
(45) Date of Patent: Jul. 20, 2010

(54) APPARATUS, AND ASSOCIATED METHOD, FOR DETECTING PACKETS

(75) Inventor: Paolo Priotti, Turin (IT)

(73) Assignee: Nokia Corporation, Espoo (FI)

( * ) Notice: Subject to any disclaimer, the term of this patent is extended or adjusted under 35 U.S.C. 154(b) by 386 days.

(21) Appl. No.: 10/583,664

(22) PCT Filed: Dec. 29, 2003

(86) PCT No.: PCT/US03/41506

§ 371 (c)(1),
(2), (4) Date: Oct. 3, 2008

(87) PCT Pub. No.: WO2005/069190

PCT Pub. Date: Jul. 28, 2005

(65) Prior Publication Data

US 2009/0175362 A1 Jul. 9, 2009

(51) Int. Cl.
*H03D 1/00* (2006.01)
*H04L 27/06* (2006.01)
*H04B 7/08* (2006.01)
(52) U.S. Cl. .................. 375/343; 375/340; 375/347
(58) Field of Classification Search ............... 375/267, 375/347, 316, 340, 362, 343, 363–369; 455/132; 370/503, 509–513
See application file for complete search history.

(56) References Cited

U.S. PATENT DOCUMENTS

| 6,687,315 | B2 | 2/2004 | Keevill et al. | |
|---|---|---|---|---|
| 7,245,588 | B2 * | 7/2007 | Poegel et al. | 370/252 |
| 7,636,404 | B2 * | 12/2009 | Guo et al. | 375/343 |
| 2002/0181509 | A1 | 12/2002 | Mody et al. | |
| 2003/0202495 | A1 * | 10/2003 | Poegel et al. | 370/338 |
| 2004/0014480 | A1 * | 1/2004 | Liu et al. | 455/502 |
| 2004/0105512 | A1 | 6/2004 | Priotti | |
| 2004/0170237 | A1 | 9/2004 | Chadha et al. | |
| 2005/0265219 | A1 * | 12/2005 | Murphy et al. | 370/208 |
| 2007/0116158 | A1 * | 5/2007 | Guo et al. | 375/343 |

* cited by examiner

Primary Examiner—Tesfaldet Bocure
(74) Attorney, Agent, or Firm—Banner & Witcoff, Ltd.

(57) ABSTRACT

In a robust system and method for detecting packets in SISO and MIMO broadband multicarrier transmission, a packet detector computes continuously the sum of the moduli of the power-normalized auto-correlations of a sequence of received signals (204), tuned on the periodicity of the training symbols. When the power-normalized auto-correlation exceeds a first predetermined threshold (206), then the maximum value of the sum of the moduli of all the cross-correlations between the received signals and the M aperiodic sequences is computed in a given time window (208), sliding in time from $-c_0$ to $c_0$. A packet is identified as received (212) when the maximum value of the sum of the moduli of the cross-correlations exceeds a second predetermined threshold (210).

20 Claims, 9 Drawing Sheets

(A) ONE REALIZATION OF THE AUTO-CORRELATION FOR ES/NO = 30 dB (B) ONE REALIZATION OF THE AUTO-CORRELATION FOR ES/NO = 25 dB (C) ONE REALIZATION OF THE AUTO-CORRELATION FOR CO-CHANNEL INTERFERER ATTENUATED 10 dB BELOW THE DESIRED SIGNAL

APPARATUS, AND ASSOCIATED METHOD, FOR DETECTING PACKETS

This application is a National Stage application of co-pending PCT application PCT/US2003/041506 filed Dec. 29, 2003, which was published in English under PCT Article 21(2) on Jul. 28, 2005. This application is incorporated herein by reference in its entirety.

TECHNICAL FIELD

The present invention relates in general to the field of wireless transmission and, more specifically, to broadband multicarrier transmission links, and still more specifically, to a robust system and method and training sequence for detecting packets in SISO and MIMO broadband multicarrier transmission.

BACKGROUND

In packet-based systems, where the arrival timing of a packet is not known a-priori, there is a need to detect an incoming packet to trigger events in the receiver, such as the synchronization chain. Among the W-LAN (wireless local area network) systems developed in recent years, there are systems that have a wide bandwidth ("BW") and are based on multicarrier modulation. These systems have a system timing that is very fast in absolute terms, and the same is anticipated with respect to next-generation cellular systems, where sampling rates will be on the order of many tens of Msps. In light of this background, it is necessary to have algorithms for packet detection that are (1) of limited computational complexity to allow fast processing, (2) not prone to false alarms, (3) that detect promptly packets even at the lower edge of the operating SNR (signal-to-noise ratio) region, and (4) if based on a training sequence, then the same sequence has to be BW-efficient and have low PAPR (peak-to-average power ratio).

To assure real-time processing, the packet detection algorithm must be relatively simple, and for this reason it is usually based on the auto-correlation of a given segment of the incoming signal. This guarantees better performance than algorithms that simply monitor the incoming signal energy. In particular, recent implementations seem to favor the use of a short repetitive pattern, used both for packet detection and for coarse frequency offset compensation. This short repetitive pattern is often referred to as utilizing "short training symbols" to indicate that one time period of the sequence is shorter than one OFDM (orthogonal frequency division multiplexing) symbol.

There are, however, drawbacks associated with using a short repetitive pattern, in that the algorithm tends to recognize as an incoming packet every repetitive noise pattern. In particular, the algorithms used with a short repetitive pattern are prone to false alarms when (1) there is a DC component in the input (interpreted as repetitive pattern) as has been the case with IEEE802.11a HW implementations, and (2) there is co-channel interference.

There is, therefore, a need for algorithms that can discriminate more effectively between packets and noise or interference. It should be noted that simple digital filtering can be applied to block a DC (direct current) component, but this can degrade somewhat the incoming signal. It should also be noted that, for next-generation cellular systems, co-channel interference problems in the case of frequency reuse factor 1 are expected to be more relevant than for W-LANs, where in many cases you do not have an adjacent cell directly interfering in your operation area.

SUMMARY

The present invention accordingly provides for a packet detection system that makes use of combined auto-correlation of the received signal and cross-correlation of the signal with a portion of the training sequence. The algorithm is based on a training sequence where the first part (e.g., preferably one or two OFDM symbols) contains a time-periodic component that can be used for both packet detection and coarse frequency offset correction. This periodic part is orthogonal between the various TX (transmission) antennas. The first part of the training sequence contains also a non-periodic component (typically in the very first OFDM symbol) used for rejecting interferers such as a DC component. Additionally, the non-periodic component is chosen to be orthogonal between different antennas.

The packet detector computes continuously the auto-correlation of the combined RX (received) signal, tuned on the periodicity of the short training symbols. When the power-normalized auto-correlation exceeds a first predetermined threshold, then the cross-correlations between the received signal and all the non-periodic components are computed in a given time window, short (e.g., 2K is small in comparison to LN) and close (e.g., the aperiodic sequence has been inserted in the first OFDM symbol) to the head of the packet. This process is preferably repeated, sliding time-wise for a quantity larger than the variance of the instant when the first threshold is crossed. A packet is considered received when the maximum value of the sum of the moduli of the cross-correlations exceeds a second predetermined threshold.

The complexity of the algorithm is kept low by limiting the length of correlation windows. For example, the length of a correlation window may be less than a standard symbol timing recovery algorithm for MIMO. Thus, if the symbol timing can be found in real time, the packet detection can also be performed in real time.

As a result of using two independent thresholds, the algorithm is more robust than algorithms based on one decision variable only (such as auto-correlation). As described in further detail below, the use of two decision variables permits, in most cases, discrimination between a desired packet and noise.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
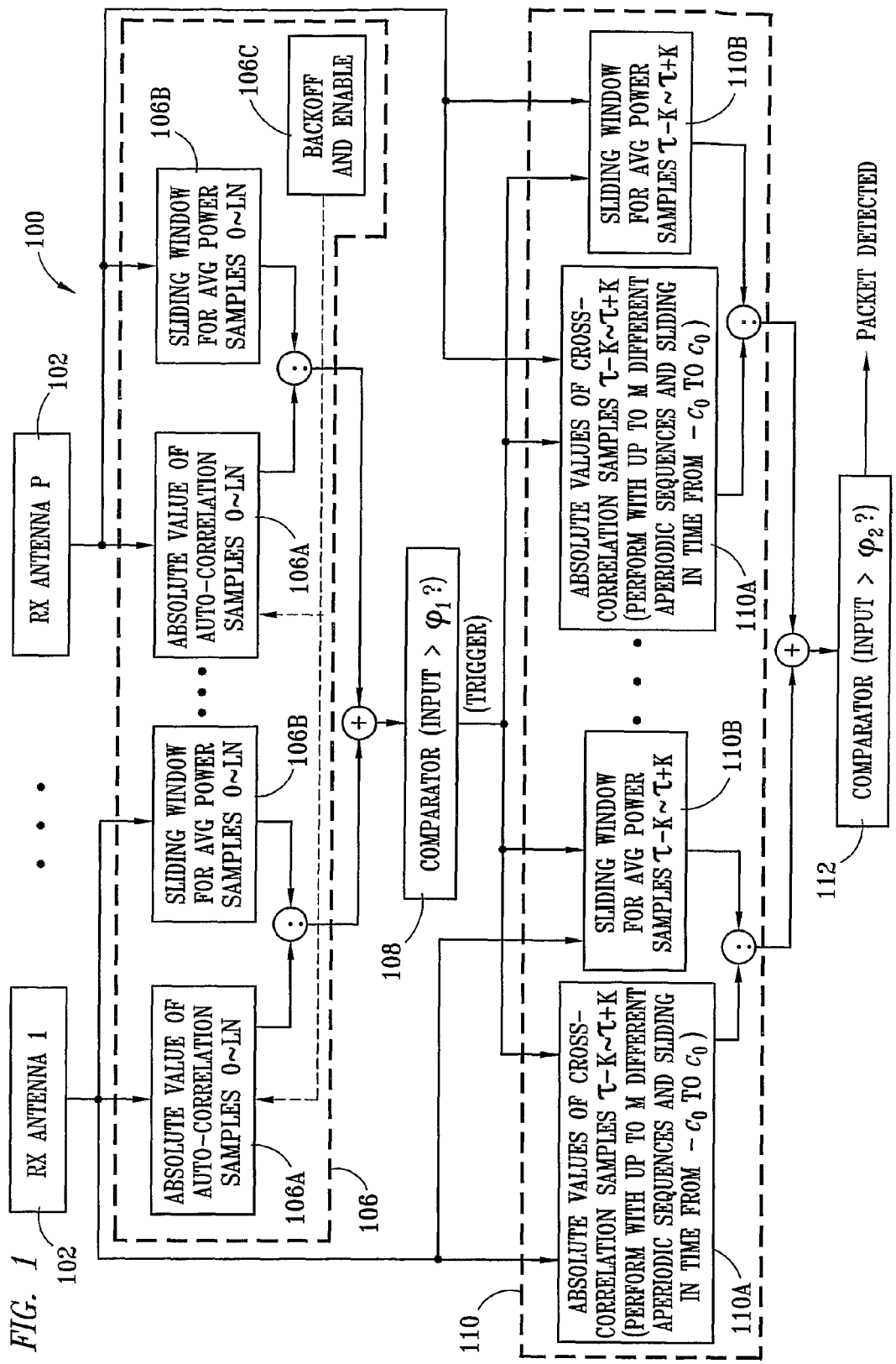
FIG. 1 presents a block diagram of the proposed algorithm.

In the following discussion, numerous specific details are set forth to provide a thorough understanding of the present invention. In some instances, well-known elements have been illustrated in schematic or block diagram form in order not to obscure the present invention in unnecessary detail. Additionally, for the most part, details concerning wireless transmission, broadband multicarrier transmission links, packet-based systems, and the like have been omitted, except insofar as necessary to describe the present invention, inasmuch as such details are not considered necessary to obtain a complete understanding of the present invention, and are considered to be within the skills of persons of ordinary skill in the relevant art.

It is noted that, unless indicated otherwise, all functions described herein are performed by a data processor in accordance with code. As used herein, the term "data processor" shall include and be used to refer to any one or more of a microprocessor, a microcontroller, an application-specific integrated circuit (ASIC), a device (e.g., a personal digital assistant (PDA), a mobile telephone, or the like), an electronic data processor (EDP), a computer, a personal computer (PC) and/or the like. Furthermore, as used herein, the term "code" shall include and be used to refer to any one or more of program code, software, integrated circuits, read-only memory (ROM), and/or the like, effective for instructing the data processor how to perform such functions. Still further, it is considered that the design, development, and implementation details of all such code would be apparent to a person having ordinary skill in the art based upon a review of the present description of the invention.

The invention can operate on both SC (single-carrier) and MC (Multi-Carrier) systems, and in both SISO (single-input, single-output) and MIMO (multiple-input, multiple-output) cases (plus combinations such as MISO and the like). Simulations have been conducted using an MC-MIMO system and, accordingly, the notation used herein refers to a system having N subcarriers, M TX antennas, and P RX antennas. In particular, the present system can bring benefit in future cellular communication systems, that are likely to be MC-MIMO. However, the following paragraphs apply fully to SC SISO and MIMO systems as well.

Let the OFDM signal at the m-th TX antenna be:

$$x_m(t) = \frac{1}{N} \sum_{n=0}^{N-1} X_m(n) e^{j2\pi nt/N}, m = 1 \ldots M \quad (1)$$

Then let the received signal at the p-th RX antenna be:

$$r_p(t) = \sum_{m=1}^{M} \sum_{l=1}^{\Delta-1} c_l^{mp}(t) x_m(t-l) + v_p(t), p = 1 \ldots P \quad (2)$$

where $\Delta$ represents the maximum delay spread of the channel (the time unit is the sampling time), $c_l^{mp}$ is the time-variant coefficient for the l-th tap in MIMO sub-channel mp, and the first tap is placed in the time origin. $v_p$ is an additive noise contribution.

The problem may be formulated as one of detecting the presence of the desired signal $r_p$ with a high reliability, without detecting other signals (e.g., thermal noise, colored interferers, and the like). The detection of the desired signal preferably occurs within a given time range from the start instant of said signal.

The performance of a packet detection algorithm can be decided by estimating the probability $P_{FA}$ of a false alarm (also referred to as false detection), and the probability of no-detection $P_{ND}$ (also referred to as miss-detection). $P_{FA}$ is calculated as the probability that an interfering signal or noise will be interpreted as a desired packet, and will trigger the receiver on, when no data can be received, causing a waste of power and, in a worst case, the loss of a desired packet. $P_{ND}$ is calculated as the probability that a desired packet is not recognized by the detection algorithm and, as such, is ignored.

Most implementations of packet detection use either the energy of the received signal or its auto-correlation as decision parameter. When one of these quantities exceeds a given threshold, a packet is considered received. However, these implementations based on a single decision parameter suffer from the following problem. If the threshold is too low, $P_{FA}$ becomes too high, but if the threshold is too high, $P_{ND}$ becomes too high. The threshold value is chosen as a compromise between these two opposite values. The threshold value can, as such, be optimized to ensure that jointly $P_{FA}$ and $P_{ND}$ are low on relative terms for a given environment, but for changing SNR and interference conditions, the performance can degrade, as discussed further below. It should be noted that, in MIMO systems, the use of space diversity guarantees a more constant received power of the combined signal, in comparison with a SISO receiver, and, as such, auto-correlation properties are improved, but the algorithm remains equally weak to colored interferers.

A more robust solution is proposed herein, wherein one more degree of freedom is provided to the detection algorithm by using two different decision parameters. In this way, two thresholds can be chosen separately and bring a higher degree of optimization. The present invention uses auto-correlation and cross-correlation as decision variables because the implementation has low complexity.

The training sequence proposed here is given by the combination of a time-periodic signal and an aperiodic signal. It is compatible with the implementation for carrier frequency offset synchronization disclosed in co-pending U.S. patent application Ser. No. 10/646,524, entitled "FREQUENCY SYNCHRONIZATION OF MIMO OFDM SYSTEMS WITH FREQUENCY-SELECTIVE WEIGHTING" and filed on Aug. 22, 2003. The overlapped aperiodic signal does not hinder correct operation of frequency offset synchronization.

The first two OFDM symbols contained in the training sequence are defined in the time domain as:

$$\tilde{x}_m(t) = \sum_{k=0}^{S\xi-1} C_m^D(t-kD) + \check{C}_m^{GD}(t-\tau), t = 0 \ldots S \cdot N - 1, \tau < N - G \cdot D \quad (3)$$

where $D=N/\xi$ represents the time period of the periodic component, $C_m^D$ is a pseudo-random sequence of length D used to build the periodic component, $\check{C}_m^{GD}$ is a random sequence of length G·D that represents the aperiodic component. $C_m^D$ and $\check{C}_m^{GD}$ are chosen so that a pseudo-orthogonality condition between different TX antennas is achieved:

$$\forall m', m'' \in \{1 \ldots M\}, \tag{4}$$

$$\sum_{t=0}^{SN-1} \tilde{x}_{m'}(t) \cdot \tilde{x}_{m''}^*(t+k) = \begin{cases} \alpha_m & \text{if } m' = m'' = m \text{ AND } K = 0 \\ \approx 0 & \text{otherwise} \end{cases}.$$

The pseudo-orthogonality condition is broader than the orthogonality condition and, as such, is inclusive of the cases in which the random sequences used to build the training sequence comprise orthogonal codes, such as Walsh-Hadamard codes.

Giving a definition of $\tilde{x}_m$ in the time domain, PAPR may be readily controlled. Alternatively, a definition in the frequency domain is also possible, wherein the periodic part uses only one every $\xi$ subcarriers. This possibility is not explored further here, but rather, a definition in the time domain alternative to (3) is given, for the case where a PAPR of 0 dB or close to 0 dB is required (this is the case when the training sequence has to be transmitted with a boosted power level, but signal distortion is unacceptable).

$$\tilde{x}_m(t) = w(t) \sum_{k=0}^{S\xi-1} C_m^D(t-kD) + \breve{C}_m^{GD}(t-\tau), \tag{3'}$$

$$t = 0 \ldots S \cdot N - 1, \tau < N - G \cdot D$$

$$\text{Where } w(t) = \begin{cases} 1/\sqrt{2} & \text{if } \tau \leq t < \tau + G \cdot D \\ 1 & \text{otherwise} \end{cases}$$

and in this case $C_m^{GD}$ is chosen to have an average power level 3 dB lower than $C_m^D$.

The part of the training sequence used by packet detection is preferably contained in the first one or two OFDM symbols of the whole training sequence to ensure that packet detection itself can operate as soon as the head of the packet has been received. For this reason the value of $\tau$ will preferably be chosen around N/2 and a choice of $1 \leq G \leq 2$ is also appropriate.

With reference to FIG. 1 of the drawings, the reference numeral 100 generally designates a packet detection apparatus of a receiver embodying features of the present invention. The packet detection apparatus 100 includes a first computational portion 106 coupled for receiving P signals from one or more receiver (RX) antennas, exemplified herein by two antennas 102. The first computational portion 106 is configured for computing continuously the power-normalized, auto-correlation of the P signals received from the RX antennas 102. More specifically, the functionality of the first computational portion 106 is achieved utilizing, for each RX antenna 102, a portion 106a configured for computing the absolute value of auto-correlation of samples 0~LN received from a respective RX antenna 102, and a portion 106b configured for computing the sliding window for average power of samples 0~LN received from a respective RX antenna 102. Depending on receiver system design, a backoff and enable portion 106c may optionally be provided for disabling the entire packet detection apparatus 100 for a given time interval, after a packet has been recognized as detected.

A first comparator 108 is connected for receiving the computed power-normalized, auto-correlation of the received signals and for generating a trigger signal to a second computational portion 110, discussed below, when the power-normalized, auto-correlation exceeds a first predetermined threshold $\phi_1$, such as exemplified in the implementation discussed below with reference to FIGS. 3-8, wherein $\phi_1 = 0.4 \cdot M$, M representing the number of RX antennas 102.

The second computational portion 110 is coupled, upon receipt of a trigger signal from the first comparator 108, for receiving P signals also from the one or more RX antennas, exemplified by the two antennas 102, and for cross-correlating the received P signals with the aperiodic portion of the training sequence. More specifically, the functionality of the second computational portion 110 is achieved utilizing, for each RX antenna, a portion 110a configured for computing the absolute value of cross-correlation samples of samples $\tau-K \sim \tau+K$ (performed with up to M different aperiodic sequences and sliding in time from $-c_0$ to $c_0$) received from a respective antenna, and a portion 110b configured for computing the sliding window for average power of samples $\tau-K \sim \tau+K$ received from a respective antenna.

A second comparator 112 is coupled to the second computational portion 110 for determining whether the maximum value of the sum of the moduli of the cross-correlations exceed a second predetermined threshold $\phi_2$, and if it does, then for generating a signal indicating that a packet has been received and detected. The generated signal may transmitted to other components of a receiver suitable to trigger further events in the receiver, such as symbol timing recovery, carrier frequency synchronization, an FFT, and/or the like, depending on how the invention is implemented.

Figure 2:
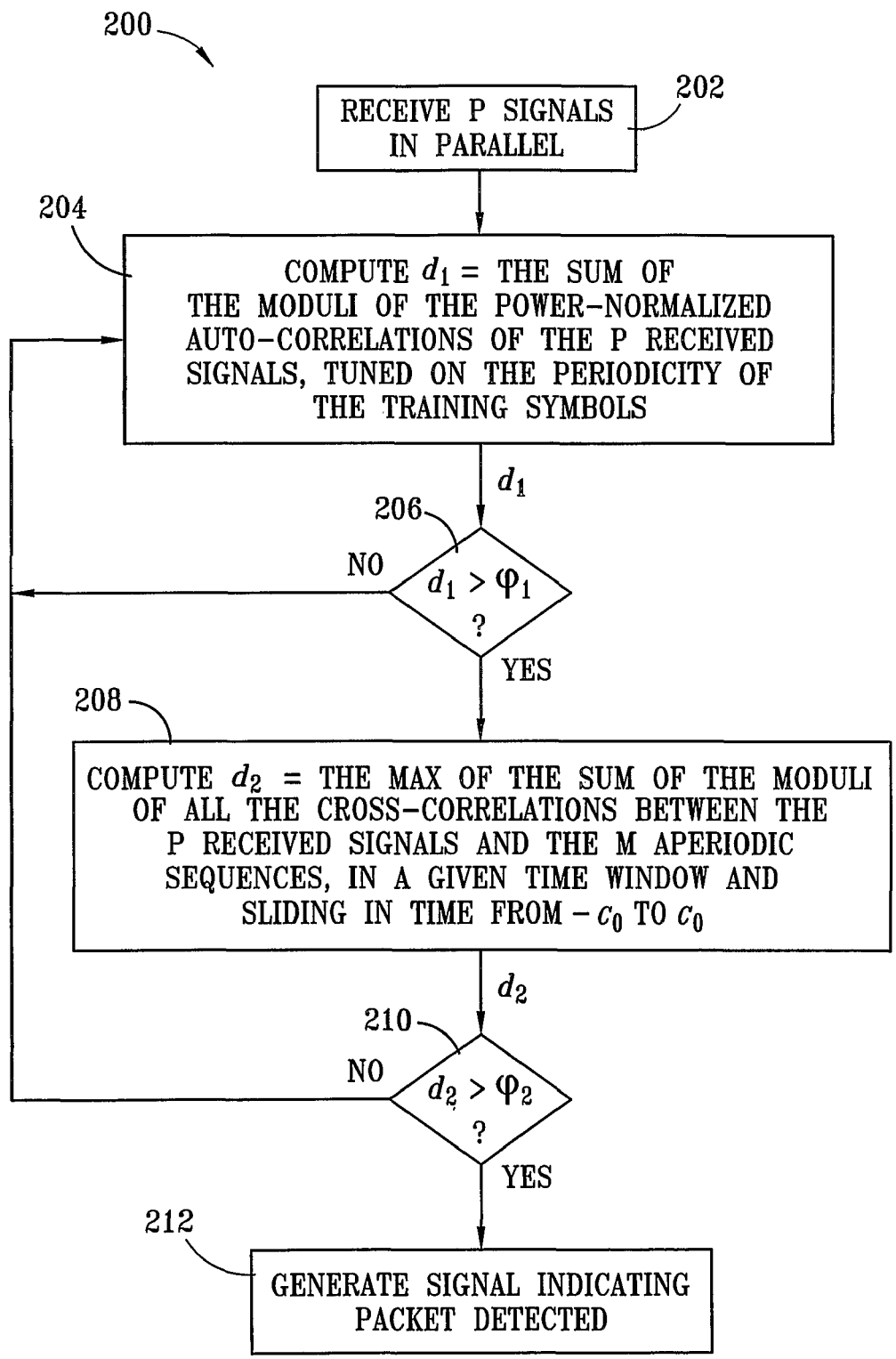
FIG. 2 presents a flow chart showing steps of operation of the invention.

Operation of the algorithm of the packet detection apparatus 100 in accordance with the present invention is exemplified by a flow chart 200 shown in FIG. 2. Accordingly, in step 202, P signals are received in parallel from the RX antennas 102. In step 204, the first portion of the algorithm is executed by the first computational portion 106, to continuously calculate the power-normalized auto-correlation $\Psi_p(k)$, that is always active, except during the reception of the payload and a possible backoff time after that.

$$\Psi_p(k) = \frac{\left| \sum_{t=0}^{LN} r_p(t) r_p^*(t+kD) \right|}{\sum_{t=0}^{LN} |r_p(t)|^2}, L \leq S \tag{5}$$

where usually k=1.

A first decision variable $d_1$ is computed as the sum of the moduli of the power-normalized auto-correlations $\Psi_p(k)$, or $$d_1 = \sum_{p=1}^{P} \Psi_p(k),$$

where the dependency from k has intentionally been dropped. $\Psi_p(k)$ and $d_1$ are preferably computed continuously for every new incoming sample.

In step 206, a transition from $d_1 \leq \phi_1$ to $d_1 > \phi_1$, where $\phi_1$ is the first threshold, generates a trigger signal to execute step 208 by the second computational portion 110, wherein the cross-correlations of the P received signals and the M aperiodic sequence, are computed on a predetermined time window, sliding from $-c_0$ to $c_0$, as follows:

$$\chi_{pm}(c) = \frac{\left|\sum_{t=\tau-K}^{\tau+K} r_p(t-c)\check{C}_m^{GD^*}(t)\right|}{\sum_{t=\tau-K}^{\tau+K} |r_p(t-c)|^2}, \quad 2K > G \cdot D. \quad (6)$$

Alternatively, the following quantity can be used as well:

$$\check{\chi}_{pm}(c) = \frac{\left|\sum_{t=\tau-K}^{\tau+K} r_p(t-c)\check{C}_m^{GD^*}(t)\right|}{\left(\sum_{t=\tau-K}^{\tau+K} |r_p(t-c)|^2 \cdot \sum_{t=\tau-K}^{\tau+K} \left|\check{C}_m^{GD}(t)\right|^2\right)^{1/2}}, \quad 2K > G \cdot D. \quad (6')$$

Letting $c_0=(1+\epsilon)\text{var}(d_1)$, where $0<\epsilon<1$, then the computation (6) or (6') is performed in the interval: $-c_0 \leq c \leq c_0$.

In step 210, executed by the second comparator 112, a second decision variable $d_2$ is computed as $$d_2(c) = \sum_{m=1}^{M}\sum_{p=1}^{P} \chi_{pm}(c).$$

Packet detection is then considered achieved if $\max_c(d_2) \geq \phi_2$, where $\phi_2$ is the second threshold. In the simulated implementation exemplified below, a value for the second threshold $\phi_2$ of 0.95 worked well; however, $\phi_2$ may vary in other implementations depending, for example, on how normalization against energy is performed.

One implementation of the invention is exemplified by way of a cellular telecommunications environment simulated in FIGS. 3-8, wherein the packet detection algorithm described above has been tested in an OFDM MIMO simulator where co-channel coloured interference and AWGN (additive white Gaussian noise) are present to quantify the behavioural advantage with respect to the traditional algorithm based on auto-correlation.

Figure 3:
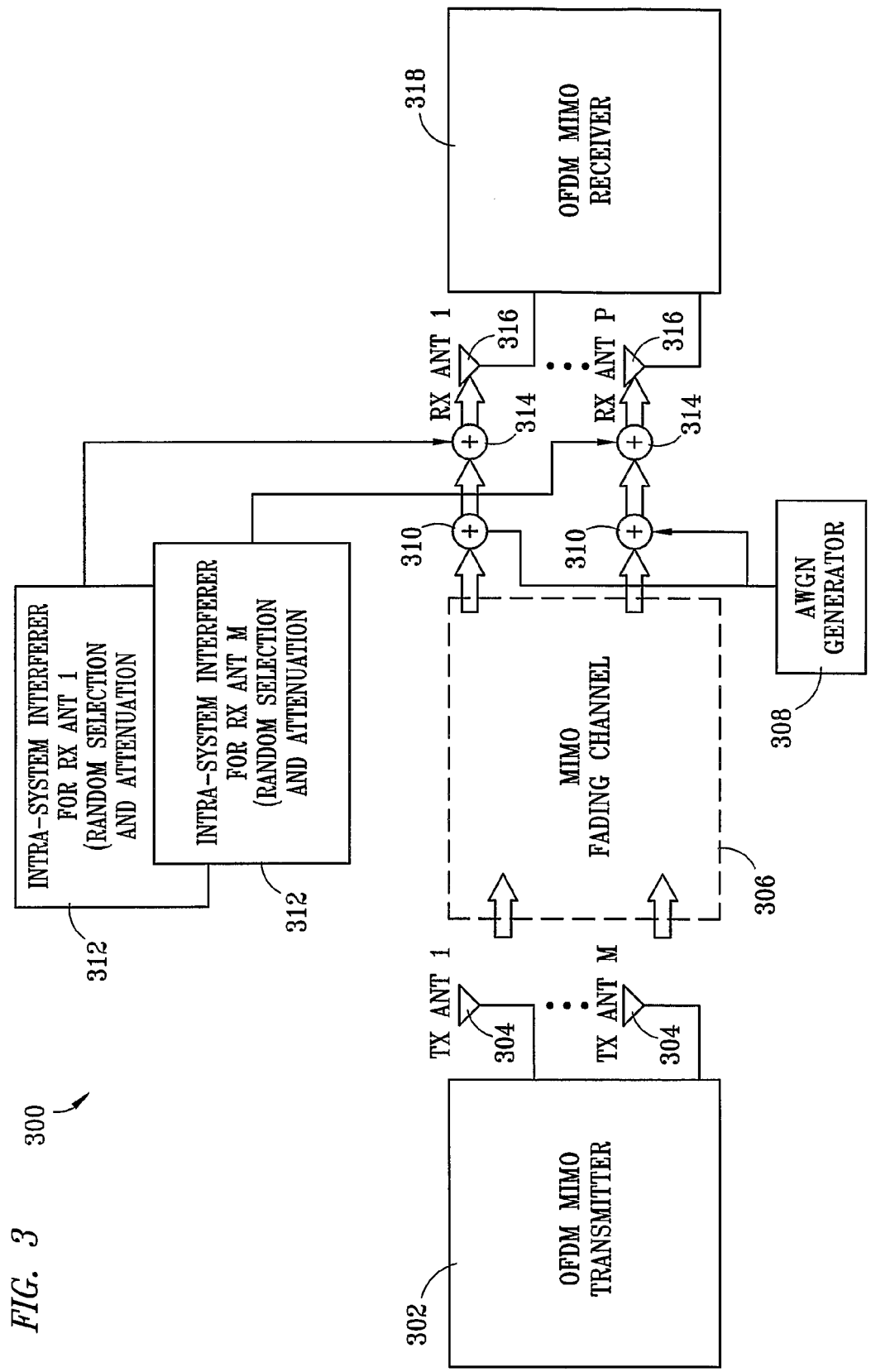
FIG. 3 presents a simulation environment used for testing the proposed packet detection algorithm.

Accordingly, FIG. 3 presents a simulation environment 300 used for testing the packet detection algorithm, wherein intra-system interferers are convolved with a frequency-selective fading MIMO channel before being summed to the desired signal. The simulation environment 300 includes an OFDM MIMO transmitter 302, such as a base-station transmitter for next-generation cell phones, having one or more TX antennas 304 configured for transmitting a signal having a BW of 100 MHz, with 2048 subcarriers, via a channel 306. The channel 306 is a METRA (Multi-Element Transmit and Receive Antenna) model based on a resampled Pedestrain-A delay profile. The mobile speed (i.e., speed of movement of a cell phone) is 3 km/h. The reference numeral 308 represents an AWGN generator that introduces noise into the signal transmitted across the channel 306 at a summer 310. One or more coloured interferers 312 are co-channel OFDM-MIMO transmitters that correspond to cell phones used in other cells, and add interference at summers 314. The interferers 312 use the same frame format of the transmitter 302 generating the desired signal, and the training sequences can be all equal or user-specific. One or more RX antennas 316 are configured for receiving the signal carried by the channel 306, with noise and interference added thereto, and for passing the received signal to an OFDM MIMO receiver 318. For every RX antenna 316, a total of four possible interferers are first chosen at random, convolved with a frequency-selective fading MIMO channel, subsequently attenuated by a random amount (min 5 dB, max 20 dB in the simulations), and finally summed to the input signal for a given antenna. It is understood that the RX antennas 316 and at least a portion of the receiver 318 correspond respectively to the two RX antennas 102 and packet detection apparatus 100 of FIG. 1.

Figure 4:
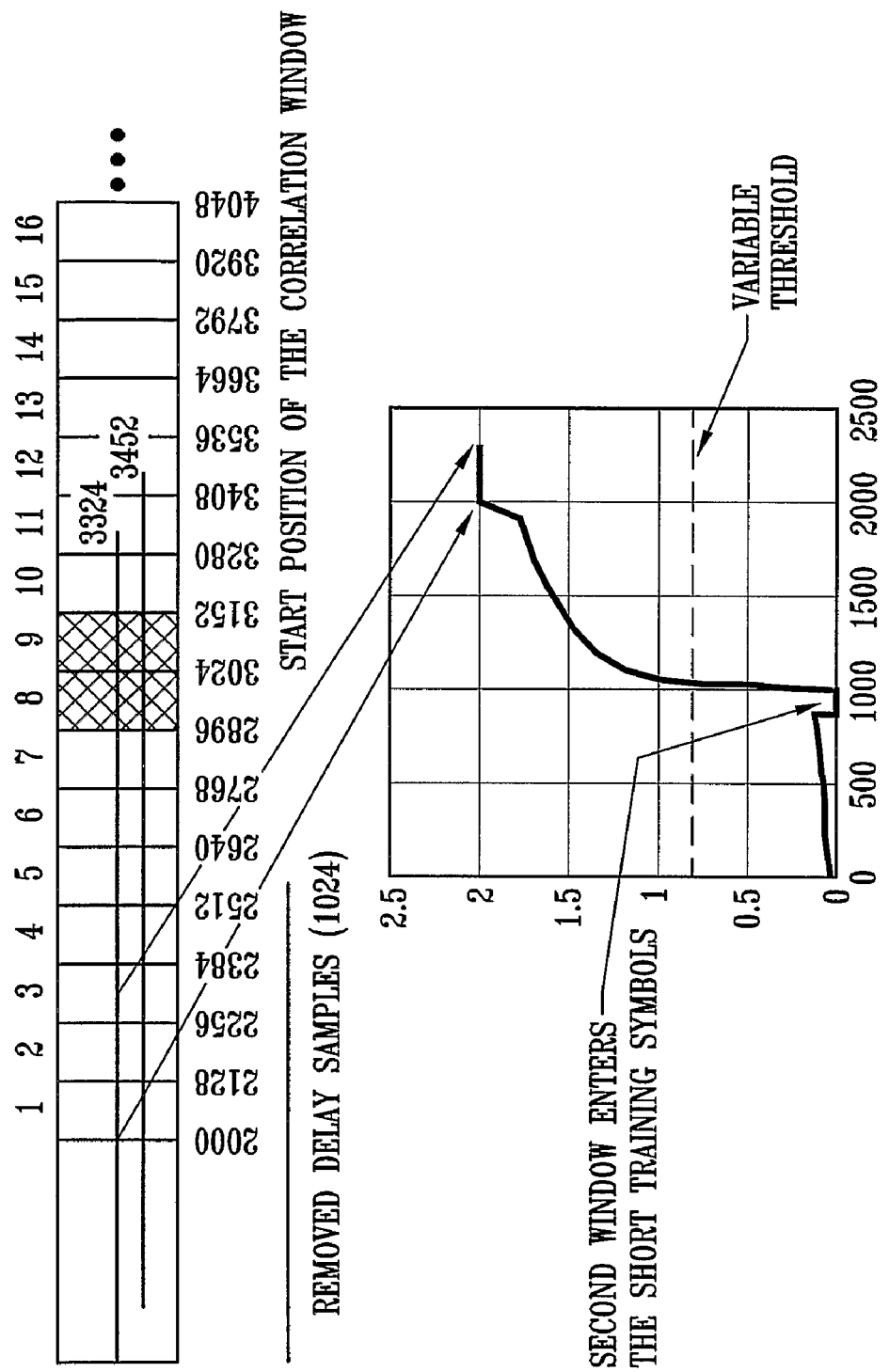
FIG. 4 presents the structure of the training sequence transmitted from a single antenna.

The training sequence is generally different for every TX antenna and follows the definition (3). FIG. 4 presents a preferred structure of the first OFDM symbol of the training sequence output from every TX antenna, shown together with its autocorrelation characteristic, wherein the horizontal axis represents the samples, and the contribution of the aperiodic portion is not included. The first 2000 samples contain noise. Starting from sample 2001 the periodic sequence is inserted with period 128. The first OFDM symbol terminates at sample 4048. It can optionally be followed by another identical symbol (without aperiodic component). Segments 8 and 9 of the first OFDM symbol have an aperiodic component summed to the main periodic pattern. Horizontal lines show the samples used for computing the auto-correlation (the first 1024 samples are not used in the algorithm).

In this specific implementation S=32, D=128, $\xi$=16. For the aperiodic section: G=2, $\tau$=7D. Autocorrelation is computed with L=8. The placement of the aperiodic portion was chosen to minimize the interference to the auto-correlation characteristic.

Figure 5A:
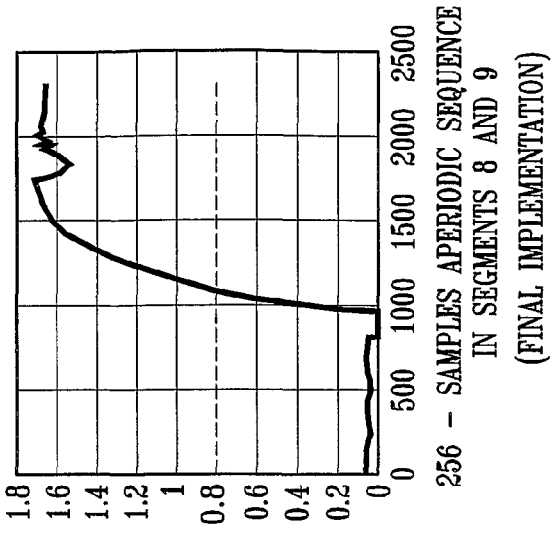
FIGS. 5A, 5B, and 5C present the effect on the auto-correlation for different placements of the aperiodic portion.
Figure 5B:
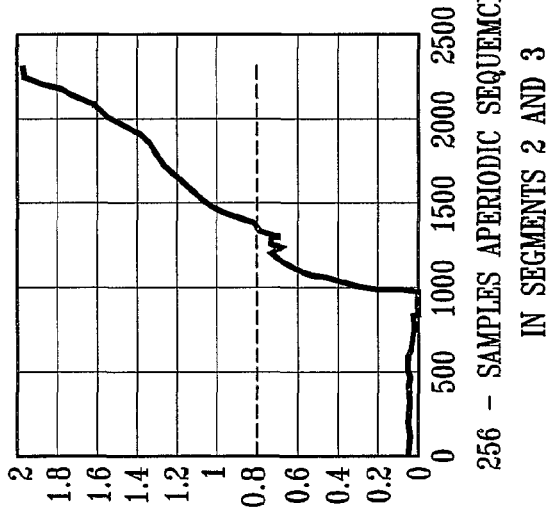
Figure 5C:
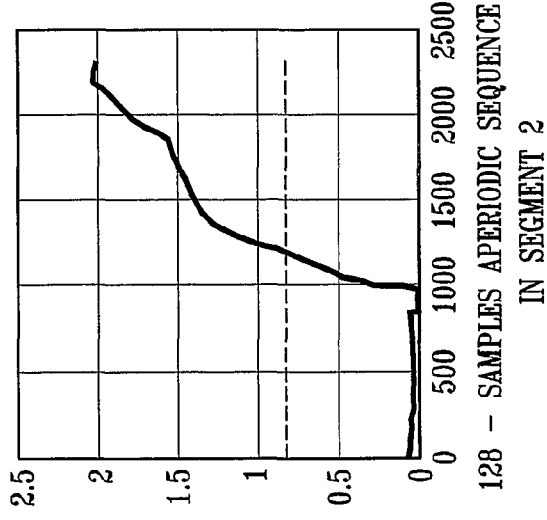

FIGS. 5A, 5B, and 5C present the effect on the shape of autocorrelation for various placements of the aperiodic part, wherein the SNR is constant in the three cases, and the horizontal axis represents the samples.

Figure 6A:
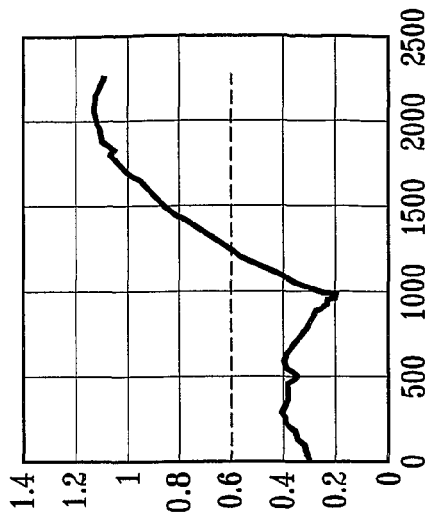
FIGS. 6A, 6B, 6C, 6D, and 6E present the changes in the autocorrelation in the presence of coloured co-channel interferers, and the cross-correlation in the same conditions.
Figure 6B:
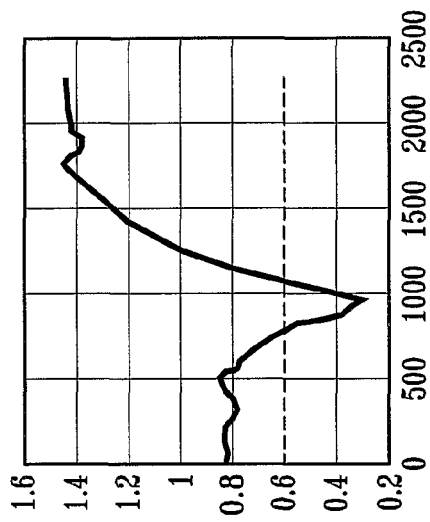
Figure 6C:
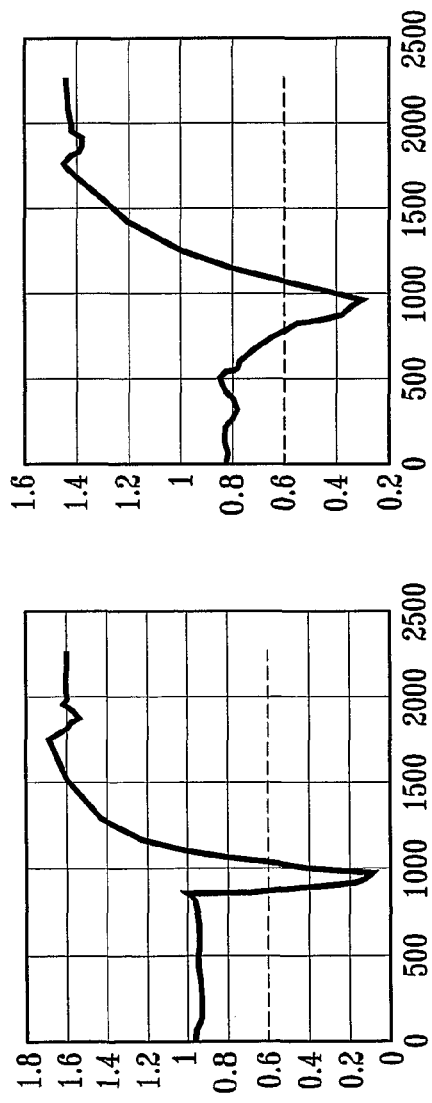
Figure 6D:
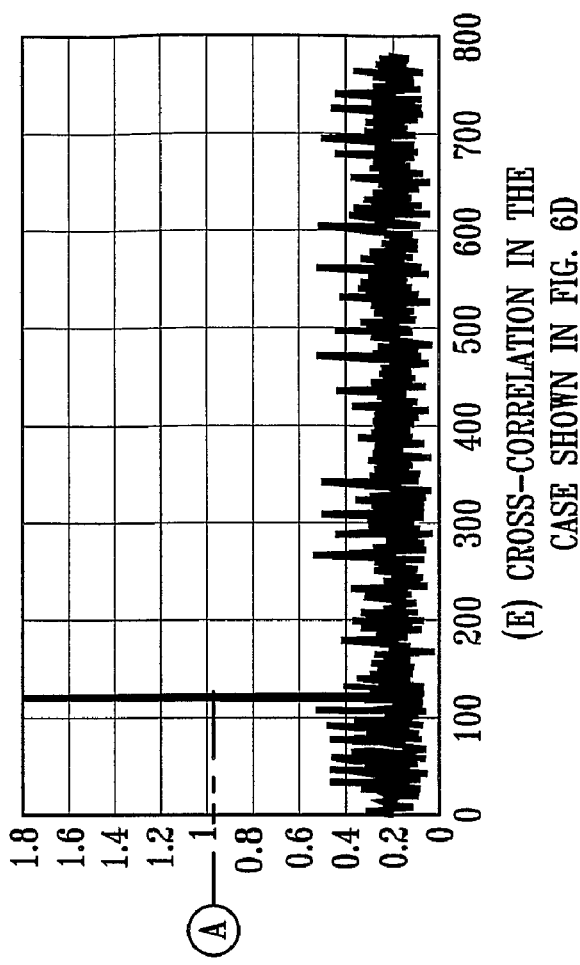
Figure 6E:
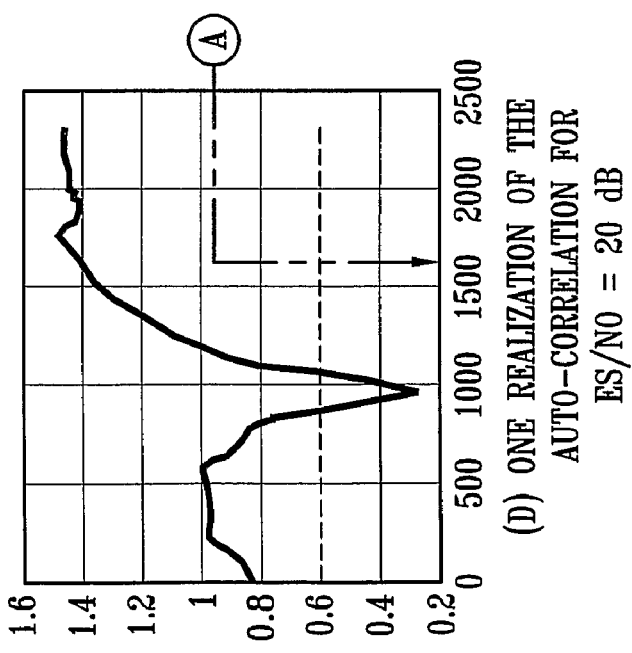

FIGS. 6A, 6B, 6C, 6D, and 6E exemplify how packet detection based on auto-correlation will generate false alarms when strong coloured co-channel interferers or a DC component are present, as shown in FIGS. 6A, 6B, and 6D. However a narrow correlation window after the packet detection point will reveal whether or not a maximum is present in the cross-correlation of the aperiodic part, so the proposed algorithm is more robust with respect to interference. The arrow designated with a letter A indicates the approximate time instant where the maximum of the cross-correlation can be found. It is noted that, in practice, the cross-correlation needs to be computed only on an interval corresponding to the variance of threshold-crossing by auto-correlation, that is, around 300 samples or less (e.g., $c_0 \approx 150$ in our simulations).

Figure 7:
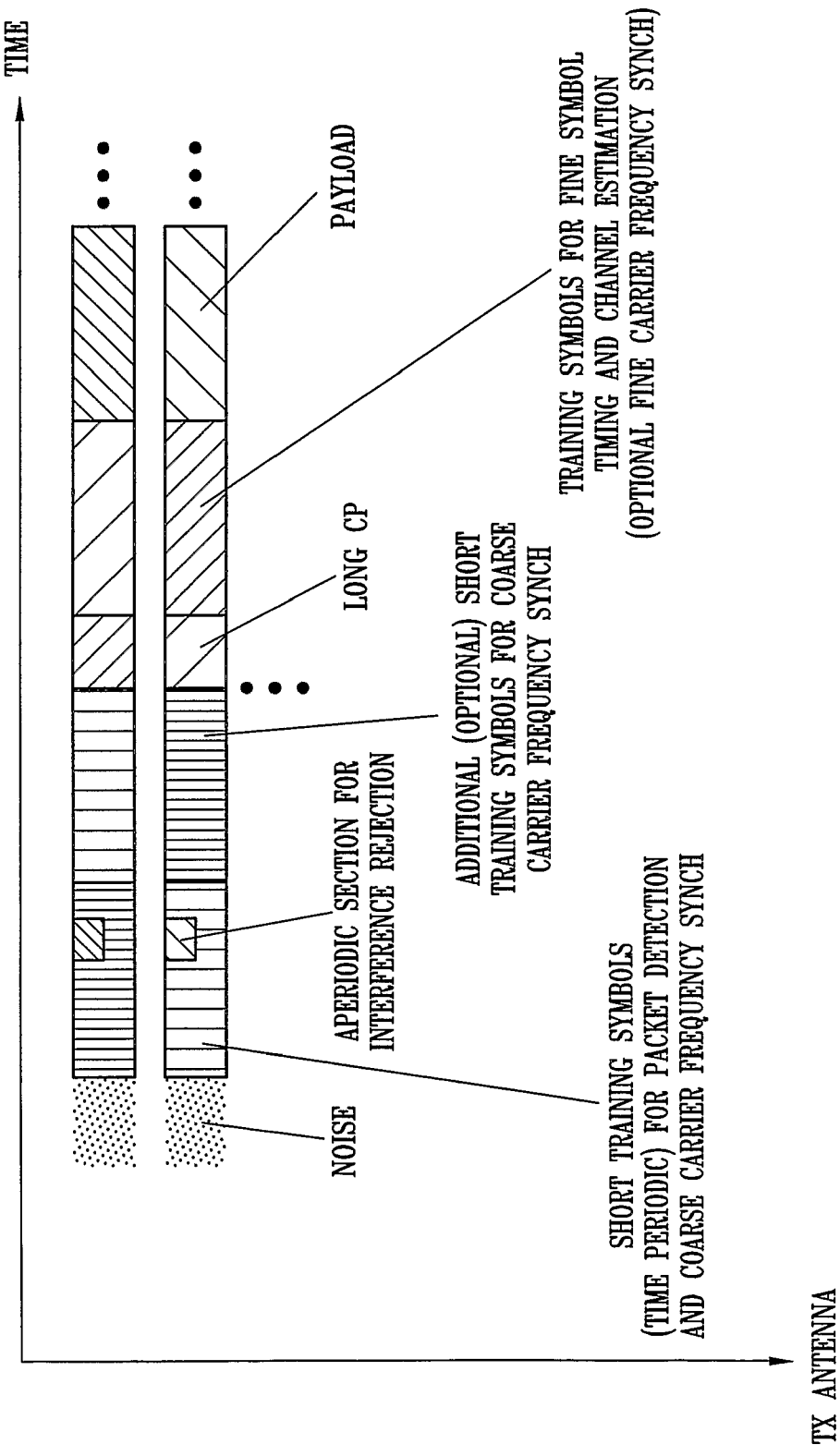
FIG. 7 presents the complete structure of the training sequence used in the implementation.

FIG. 7 present the structure of the training sequence indicating with different cross-hatching that sequences transmitted from different antennas are time-orthogonal.

Figure 8:
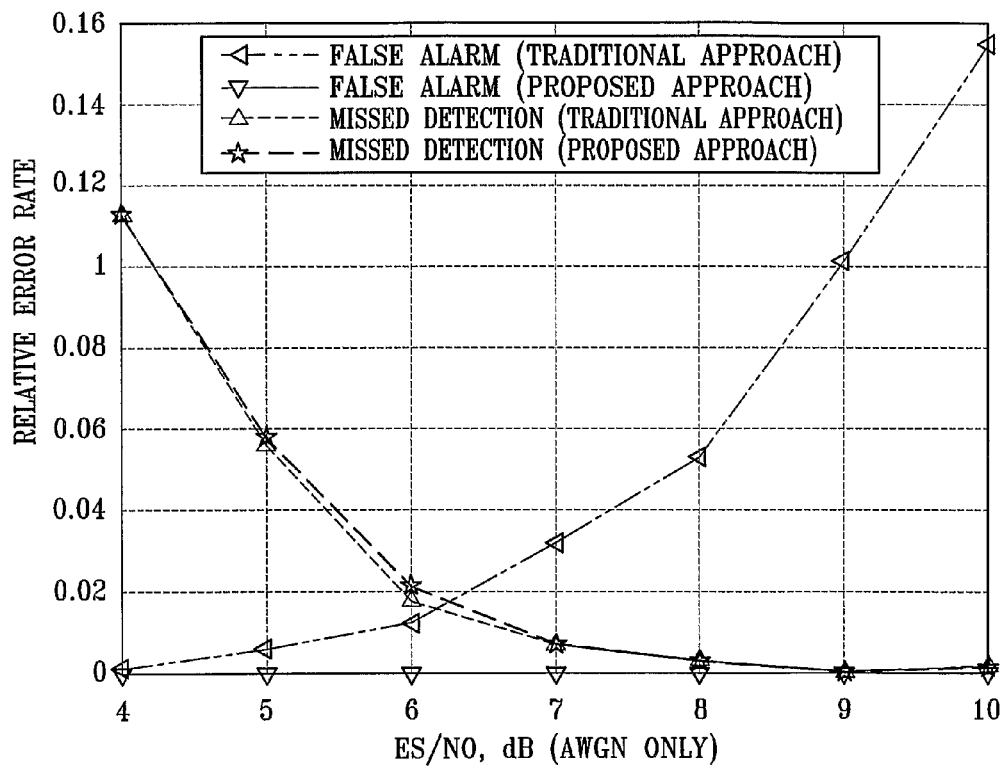
FIG. 8 presents a comparison of the performance of the proposed system with the auto-correlation based approach.

FIG. 8 presents performance parameters for the traditional approach, and the proposed approach embodying features of the present invention. On the horizontal axis, Es/No with respect to AWGN is shown. Co-channel interference has been inserted with a random attenuation of 5~20 dB, as explained above in the simulation model.

It can be seen in FIG. 8 that for Es/No<6 dB the performance of the auto-correlation based detection starts to drop, indicating that in both approaches packets start to be lost. For Es/No>6 dB on the other hand, the traditional approach starts to be triggered on false events, and the phenomenon becomes particularly relevant at approximately 10 dB. The proposed approach, instead, effectively discriminates between desired packets and interferers, showing a false-alarm rate close to zero, which is dramatically less than the rate that may be obtained using the traditional approach. Moreover, missed detection performance is generally not affected by the use of a double threshold.

In cellular systems with frequency reuse 1 or higher than 1, it is possible to have co-channel interference between packets belonging to the user's cell and packets transmitted from other cells. In the implementation of the invention, the discrimination of the desired packet from the interfering packets can occur, embedding a cell-specific code for a given cell (concept similar to the 'colour code' for GSM), that is referred to as a base-station identifier. With the algorithm illustrated in the above paragraphs, the use of cross-correlation will permit a cell phone to distinguish between packets sent by different base-stations.

In the aforementioned type of implementation of the invention, the aperiodic section of the short training symbols will be coincident with the base-station identifier itself or one portion of the aperiodic section will be given by the same identifier modulated in a given way. For example, if the identifier is a binary number, one part of the aperiodic section may contain that identifier modulated in QPSK for PAPR reduction. The identifier itself may be fixed for a given base station, or chosen randomly if the network is dynamically reconfigured in time (as could be the case for a virtual bus in the case that relay-BTS are adopted).

By use of the present invention, the proposed approach, including training sequence and algorithm, improves considerably the reliability of the packet detection process. As a consequence, useless triggering of the receiver is prevented, with a saving in power consumption. In particular, the proposed approach has a definite advantage in the case of co-channel coloured interference for cellular and W-LAN systems, and in the case that a DC component or any kind of time-periodic noise is present in the received signal. In such cases, the proposed system with two separate decision variables improves dramatically the false alarm performance compared to traditional algorithms based on auto-correlation or received energy. It should be noted here that to optimally exploit the ability of the present invention to reject interference, it is necessary to select the aperiodic section of the training sequence in such a way that it is possible to discriminate useful packets and interfering packets. The allocation of the aperiodic section can be optimized once a given network architecture is adopted. The "base station identifier" concept mentioned above is one example of an optimized approach.

It is understood that the present invention may take many forms and embodiments. Accordingly, several variations may be made in the foregoing without departing from the spirit or the scope of the invention. For example, if four or more TX antennas are available, a slightly different approach can be followed. In this approach, the periodic component of the short training symbols is transmitted from a given subset of the total TX antennas, and the aperiodic component of the short training symbols is transmitted from the remaining TX antennas. Overall performance will be comparable to the approach described above.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention and that the claims will therefore cover any such modifications or embodiments that fall within the true scope and spirit of the invention.

The invention claimed is:

1. A method for detecting a packet in multiple signals received in parallel from at least two transmission antennas, the method being characterized by steps of:
    computing the power-normalized auto-correlations of the received signals tuned on the periodicity of short training symbols, said short training symbols having time periods shorter than one OFDM symbol;
    determining whether the sum of the moduli of the power-normalized, auto-correlation exceeds a first predetermined threshold;
    upon a determination that the sum of the moduli of a power-normalized, auto-correlation exceeds the first predetermined threshold, computing the cross-correlations between the received signals and the aperiodic sequences in a selected time window, said time window sliding in time for a quantity larger than the variance of the first predetermined threshold crossing instant;
    computing the maximum value of the sum of the moduli of the cross-correlations;
    determining whether the maximum value of the sum of the moduli of the cross-correlations exceeds a second predetermined threshold; and
    upon a determination that the maximum value of the sum of the moduli of the cross-correlations exceeds a second predetermined threshold, identifying a packet as received.

2. The method of claim 1 further characterized in that, upon a determination that the sum of the moduli of a power-normalized, auto-correlation does not exceed the first predetermined threshold, repeating the step of computing the power-normalized auto-correlations of next received signals tuned on the periodicity of short training symbols.

3. The method of claim 1 further characterized in that the short training symbols constitute a first part of a training sequence comprising at least one OFDM symbol having a time-periodic component effective for packet detection and coarse frequency offset correction.

4. The method of claim 1 further characterized in that the short training symbols constitute the first part of a training sequence, and wherein the part of the training sequence used for packet detection is contained in the first at least one OFDM symbol of the whole training sequence.

5. The method of claim 1 further characterized in that the periodic portion of the received signals is substantially orthogonal between said at least two transmission antennas.

6. The method of claim 1 further characterized in that the first part of the training sequence is further characterized by a non-periodic component effective for rejecting interferers.

7. The method of claim 1 further characterized in that the first part of the training sequence is further characterized by a non-periodic component effective for rejecting interferers, said interferer comprising a DC component.

8. The method of claim 1 wherein the first part of the training sequence is further characterized by a non-periodic component in the first OFDM symbol, and is effective for rejecting interferers.

9. The method of claim 1 further characterized in that the first part of the training sequence is further characterized by a non-periodic component in the first OFDM symbol, and is effective for rejecting interferers, said interferers including a DC component.

10. The method of claim 1 further characterized in that the non-periodic component is orthogonal between said at least two transmission antennas.

11. An apparatus for detecting a packet in multiple signals received in parallel from at least two transmission antennas, the apparatus being characterized by:
- a first computational portion configured for computing the power-normalized auto-correlations of the received signals tuned on the periodicity of short training symbols, said short training symbols having time periods shorter than one OFDM symbol;
- a first comparator configured for determining when the sum of the moduli of the power-normalized, auto-correlation exceeds a first predetermined threshold;
- a second computational portion configured, upon a determination that the sum of the moduli of a power-normalized, auto-correlation exceeds the first predetermined threshold, for computing the cross-correlations between the received signals and the aperiodic sequences in a selected time window, said time window sliding in time for a quantity larger than the variance of the first predetermined threshold crossing instant; and
- a second comparator configured for computing the maximum value of the sum of the moduli of the cross-correlations, and for determining when the maximum value of the sum of the moduli of the cross-correlations exceeds a second predetermined threshold, and upon a determination that the maximum value of the sum of the moduli of the cross-correlations exceeds a second predetermined threshold, for identifying a packet as received.

12. The apparatus of claim 11, wherein said first computational portion is further characterized, upon a determination that the sum of the moduli of a power-normalized, auto-correlation does not exceed the first predetermined threshold, as computing the power-normalized auto-correlations of next received signals tuned on the periodicity of short training symbols.

13. The apparatus of claim 11 further characterized in that the short training symbols constitute a first part of a training sequence comprising at least one OFDM symbol having a time-periodic component effective for packet detection and coarse frequency offset correction.

14. The apparatus of claim 11 further characterized in that the short training symbols constitute the first part of a training sequence, and wherein the part of the training sequence used for packet detection is contained in the first at least one OFDM symbol of the whole training sequence.

15. The apparatus of claim 11 further characterized in that the periodic portion of the received signals is substantially orthogonal between said at least two transmission antennas.

16. The apparatus of claim 11 further characterized in that the first part of the training sequence is further characterized by a non-periodic component effective for rejecting interferers.

17. The apparatus of claim 11 further characterized in that the first part of the training sequence is further characterized by a non-periodic component effective for rejecting interferers, said interferer comprising a DC component.

18. The apparatus of claim 11 wherein the first part of the training sequence is further characterized by a non-periodic component in the first OFDM symbol, and is effective for rejecting interferers.

19. The apparatus of claim 11 further characterized in that the first part of the training sequence is further characterized by a non-periodic component in the first OFDM symbol, and is effective for rejecting interferers, said interferers including a DC component.

20. The apparatus of claim 11 further characterized in that the non-periodic component is orthogonal between said at least two transmission antennas.

* * * * *